United States Patent
Devlen et al.

(10) Patent No.: US 12,359,724 B2
(45) Date of Patent: Jul. 15, 2025

(54) SEALING SET

(71) Applicant: KASTAŞ SIZDIRMAZLIK TEKNOLOJİLERİ SANAYİ VE TİCARET ANONİM ŞİRKETİ, Izmir (TR)

(72) Inventors: Ozan Devlen, Izmir (TR); Sercan Karakoç, Izmir (TR); Cem Tanyeri, Izmir (TR)

( * ) Notice: Subject to any disclaimer, the term of this patent is extended or adjusted under 35 U.S.C. 154(b) by 0 days.

(21) Appl. No.: 18/248,746

(22) PCT Filed: Dec. 30, 2021

(86) PCT No.: PCT/TR2021/051619
§ 371 (c)(1),
(2) Date: Apr. 12, 2023

(87) PCT Pub. No.: WO2023/128899
PCT Pub. Date: Jul. 6, 2023

(65) Prior Publication Data
US 2024/0369138 A1    Nov. 7, 2024

(51) Int. Cl.
| | |
|---|---|
| *F16J 15/16* | (2006.01) |
| *F15B 15/14* | (2006.01) |
| *F15B 15/16* | (2006.01) |
| *F16J 15/3208* | (2016.01) |
| *F16J 15/48* | (2006.01) |

(52) U.S. Cl.
CPC ......... *F16J 15/164* (2013.01); *F15B 15/1452* (2013.01); *F15B 15/16* (2013.01); *F16J 15/3208* (2013.01); *F16J 15/48* (2013.01)

(58) Field of Classification Search
CPC ......... F16J 15/164; F16J 15/3208; F16J 15/48
USPC .......................................................... 277/347
See application file for complete search history.

(56) References Cited

U.S. PATENT DOCUMENTS

| | | | | |
|---|---|---|---|---|
| 4,576,386 A | * | 3/1986 | Benson | F16J 15/166 277/944 |
| 5,165,703 A | * | 11/1992 | Morvant | F16J 15/20 277/342 |
| 5,328,177 A | * | 7/1994 | Lair | F16J 15/3208 277/584 |

(Continued)

FOREIGN PATENT DOCUMENTS

| | | |
|---|---|---|
| CN | 202833411 U | 3/2013 |
| CN | 104595486 A | 5/2015 |

(Continued)

OTHER PUBLICATIONS

International Search Report and Written Opinion of the International Searching Authority for corresponding PCT/TR2021/051619 dated Jun. 29, 2022.

*Primary Examiner* — Nathan Cumar
(74) *Attorney, Agent, or Firm* — Egbert, McDaniel & Swartz, PLLC

(57) ABSTRACT

Disclosed is a seal ring, which is located in a double-acting telescopic cylinder having a plurality of nested rods and sealing elements between the piston moving in the rod and the rod, an energizer ring which provides the contact of the seal ring with the rod by applying pressure to the sealing set, a back-up ring which is positioned mirrored on both sides of the seal ring, and a sealing set which is positioned mirrored in the sealing groove of the piston in the x-axis and which contains the guide element.

4 Claims, 4 Drawing Sheets

(56) References Cited

U.S. PATENT DOCUMENTS

| | | | | |
|---|---|---|---|---|
| 6,502,826 B1 * | 1/2003 | Schroeder | ................. | F16J 9/06 |
| | | | | 277/482 |
| 2015/0136083 A1 * | 5/2015 | Lippitt | ................ | F02D 41/0087 |
| | | | | 123/445 |

FOREIGN PATENT DOCUMENTS

| | | | | |
|---|---|---|---|---|
| CN | 209212688 U | 8/2019 | | |
| CN | 214888088 U | 11/2021 | | |
| TR | 200400159 U | 5/2004 | | |
| WO | WO-2014091930 A1 * | 6/2014 | ............. | F16J 15/166 |

* cited by examiner

SEALING SET

FIELD OF THE INVENTION

The invention relates to a piston sealing element to be used in double-acting telescopic cylinders.

In particular, the invention relates to a sealing element that can work on the dynamic sealing surface designed in accordance with the telescopic cylinder to be used horizontally and vertically in different transport solutions.

STATE OF THE ART

Sealing elements used in telescopic hydraulic cylinders are subjected to heavy loads. The leakage amount must be within the limit values in order to create a movement of the desired power with the pressurized fluid applied to the hydraulic cylinder.

Standard telescopic hydraulic cylinders have a sealing element that can operate within the limit values. However, hydraulic telescopic cylinder rod have non-standard diameter and surface roughness in applications where this invention is used. There are no sealing elements to provide the limit leakage value (maximum 80 cc/min) determined for use in these cylinders. In addition, the sealing elements used in high-pressure systems where a double-acting telescopic cylinder is used are generally compact sets consisting of more than one part as in the present invention. Contact and pressure transfer of parts manufactured from different materials in these sets is critical for not exceeding the determined maximum leakage amount.

The surface roughness of the telescopic cylinder is:

|    | (rod)        | (groove base) | (groove flanks) |
|----|--------------|---------------|-----------------|
| Ra | max 1.6 μm   | max 0.8 μm    | max 3.2 μm      |
| Rt | max 16 μm    | max 8 μm      | max 16 μm       |

The permissible sealing gap between the rod and the sealing set may increase depending on the rod diameter tolerances and the axial loads to the telescopic cylinder. The sealing set can close this gap in the cylinder by deforming under pressure. This gap must be formed in the system to a certain extent at certain pressure values in order to prevent the deformation that will occur in the system with metal-to-metal contact and the parts must be manufactured considering this situation. The largest rod diameter in which this invention is used deviates by +0.59 mm in the rod diameter according to the greatest tolerance. There is no sealing set in the present art that can work healthy in maximum and minimum conditions that cause this tolerance.

The chronic problem of sealing sets integrated with telescopic cylinders is as follows in the present art:

These telescopic cylinders using double-acting piston seals use rods manufactured in a high tolerance range depending on the production method. The maximum rod tolerance for the largest rod diameter in the telescopic cylinders used in this scenario is +0.59 mm while the H8 tolerance class is used in the general hydraulic cylinder rods. This poses a problem in the healthy operation of standard sealing sets in the systems.

There are some applications in the national and foreign patent literature regarding the sealing system integrated in telescopic cylinders.

The application with the code TR200400159, which is found in the national patent literature, is covered with step rods and teflon guidings in tubular type jointed telescopic cylinders. Movable joint guide, movable joint H 10/f8 tolerances are used.

The main rod grade rods are covered with chrome and the grade rods are welded with bronze bushings. The joint rod is fixed with the rear cover e-bolts. wiper, teflon guide, oring, guidings sealing set are used in order not to damage the cylinder. The joint rod is characterized by fixing it with the rear cover bolts.

The application CN202833411 U in the Chinese patent literature relates to a double-acting telescopic cylinder, the cylinder body, the oil inlet port at the bottom of the cylinder body, and the piston located inside the cylinder body and having a rod that moves in the cylinder. At the other end of the piston rod is a connecting lug. A guide sleeve is positioned between the inner wall of the cylinder at the front end and the piston rod. The guide sleeve, piston rod, and the inner wall of the cylinder body are connected to each other by YX-type sealing and prevent dust from entering the cylinder with the G-type sealing ring. Multiple circular pockets supported by a sliding ring, which is combined within the outer wall of the piston, back-up rings and sealing rings, are located inside. The double-acting telescopic cylinder has excellent sealing performance and prevents internal leaks of the hydraulic cylinder, as the cylinder pistons use advanced sliding ring type combined sealing elements at all levels. In addition, at the end of the piston rod, to prevent external leaks of the hydraulic cylinder, the double sealing system formed in the G-type sealing ring and the YX-type sealing ring is used.

The existence of the above problems and the absence of an existing solution made it necessary to make an improvement in the related technical field, as a result.

AIM OF THE INVENTION

The invention aims to solve the aforementioned problems, to eliminate all the disadvantages and to bring additional advantages to the structure.

The main aim of the invention is to eliminate the problem of failure to provide sealing at high pressures and variable rod diameters by determining the material and design criteria that provide technical specifications such as −40° C. to 80° C. temperature range, 0.5 m/s opening speed and 1 m/s closing speed, 250 bar dynamic and 350 bar static pressure, maximum leakage amount less than 80 cc/min, use of mineral oil and biodegradable based synthetic ester in the cylinder, oil viscosity in a wide range of 10-2000 cst and tube material being EN 10305-1 E355+SRA in order to solve the problems defined above.

The invention is designed as a triangular cut so that the guiding element and the back-up ring have a geometric structure that can slide over each other to fulfill the above-mentioned purposes.

Thus, the permissible sealing gap is closed and safe to work thanks to these two parts that act on each other in cases of maximum permissible sealing gap caused by high tolerance, which varies according to the field of manufacture and use of the telescopic cylinder.

The structural, characteristic features of the invention will be understood more clearly by reference to the following drawings and the detailed description thereof.

Therefore, the evaluation should be made by taking these figures and detailed explanations into consideration.

LIST OF THE REFERENCE NUMBERS

Figure 1:
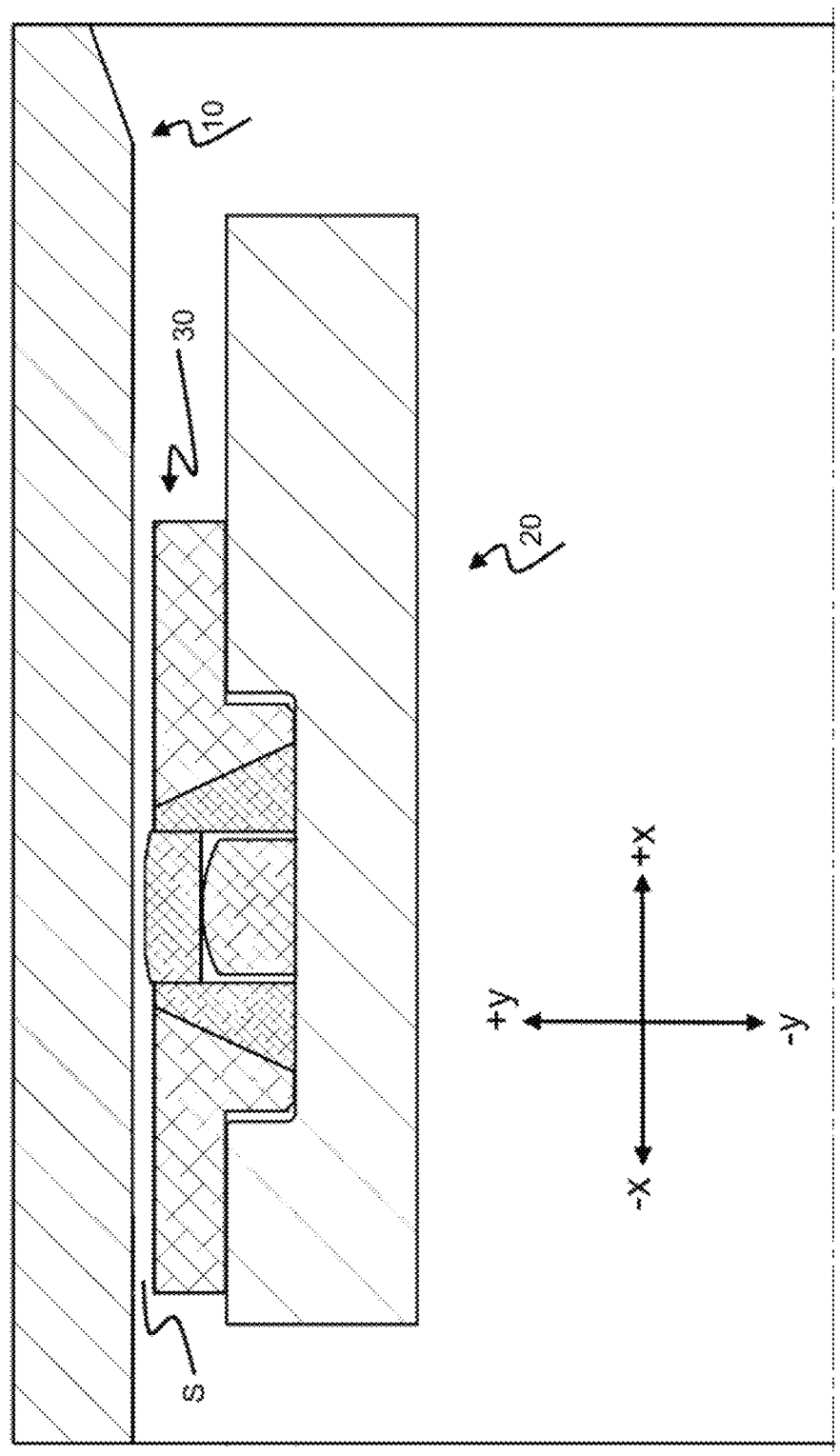
FIG. 1. It shows that the sealing set is mounted in the piston groove and is depressurized.
Figure 2:
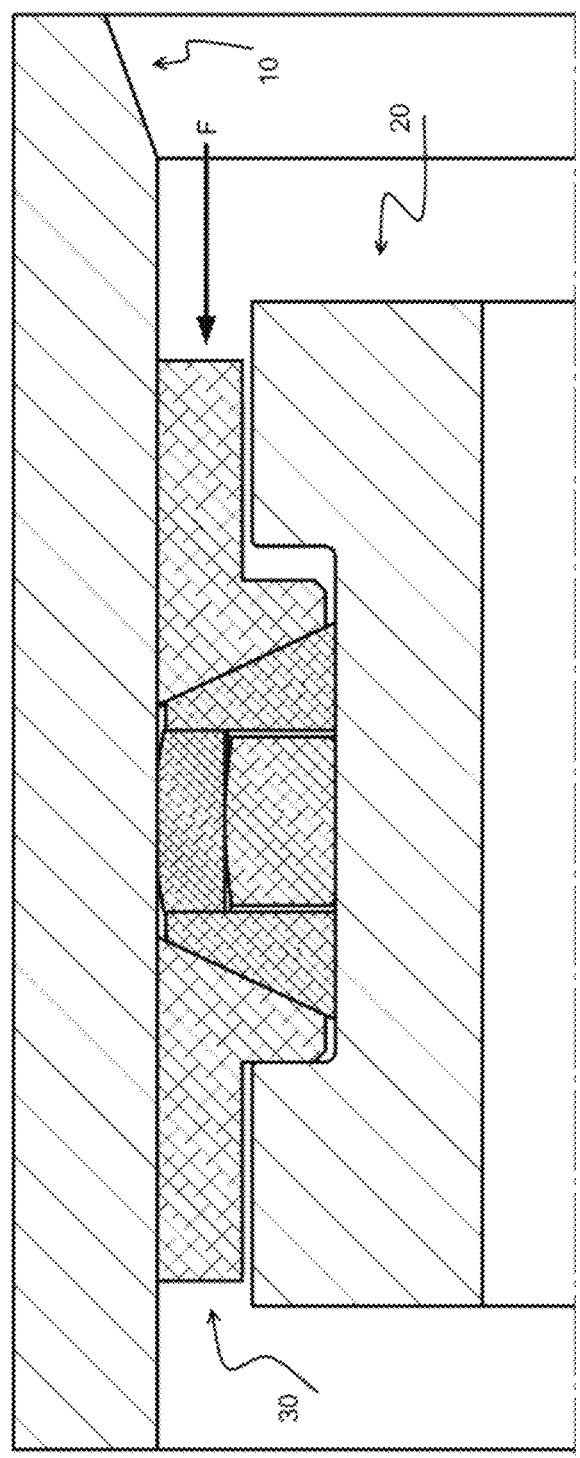
FIG. 2. It indicates that the sealing set is mounted and pressurized in the piston groove.
Figure 3:
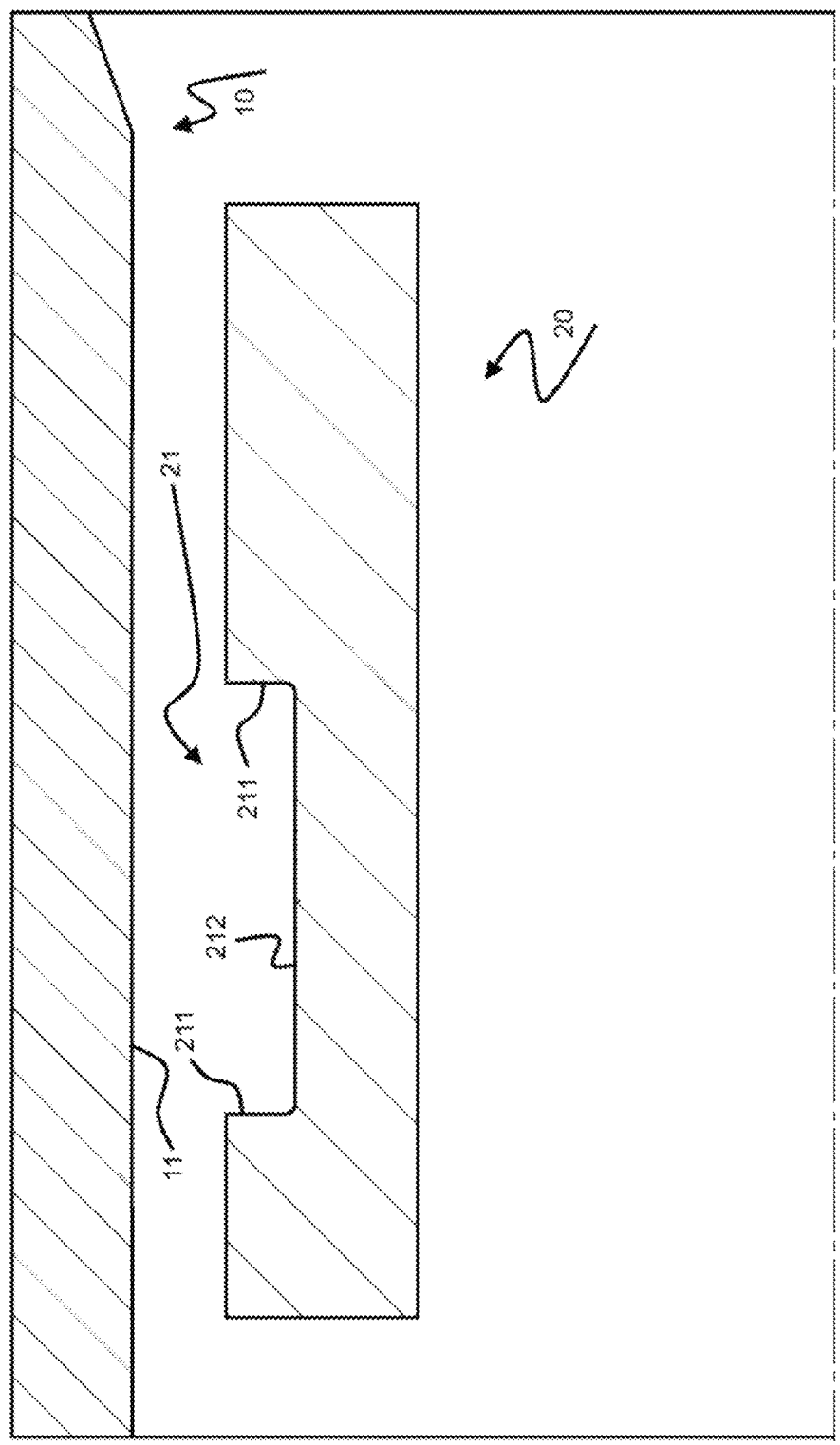
FIG. 3. It shows the groove where the sealing set will be used.
Figure 4:
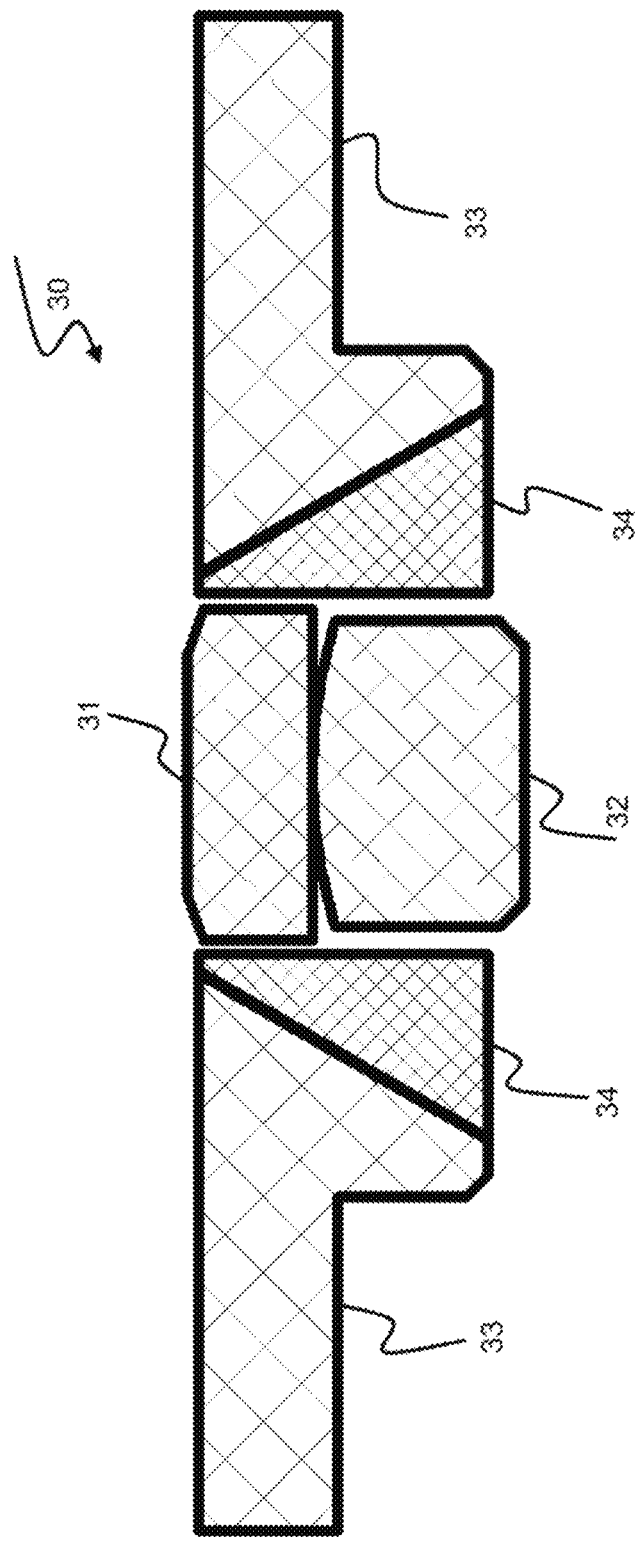
FIG. 4. It shows the sealing set.

10. Rod
    11. Interior surface
20. Piston
    21. Sealing set groove
        211. Groove flanks
        212. Groove base
30. Sealing set
    31. Seal ring (1)
    32. Energizer ring (2)
    33. Guide element (3)
    34. Back-up ring (4)
S. Permissible sealing gap
F. Pressure effect force

DETAILED DESCRIPTION OF THE INVENTION

The sealing set (30) is used in a double-acting telescopic cylinder consisting of a plurality of intertwined rods (10) with sealing set groove (21) opened thereon. The sealing set (30) seals between the piston (20) moving in the rod (10) and the rod (10). The sealing set (30) is mounted in the sealing set groove (21) on the piston (20). The sealing set groove (21) consists of the groove flanks surface (211) and the groove base surface (212) opening onto the piston (20).

The sealing set (30) consists of the seal ring (31), the energizer ring (32), the guide element (33) and the guide ring (34).

The energizer ring (32) is a highly elastic material that seals the groove base (212) as a result of applying pressure to the sealing set (30), contacts the seal ring (31) with the rod (10) and activates the sealing set (30).

The seal ring (31) is a Z-cut ring consisting of additive polyamide material that is in contact with the interior surface (11) of the rod (10), seals between the piston (20) and the rod (10).

The guide element (33) is the element that is positioned in the sealing set groove (21) of the piston (20) in the x-axis and that presses against the groove flanks (211) against the pressure effect force (F) in the x-axis. The guide element (33) has an angled surface of 45° and contacts the back-up ring (34) with the angled surface.

The back-up ring (34) is a ring that is positioned mirrored on both sides of the seal ring (31), maintains the stability of the sealing set (30) under fluid pressure, increases the sealing performance and ensures proper operation with the guide element (33) with variable rod (10) diameters. The back-up ring (34) has a special geometry with an angled surface of 45° and consists of a thermoplastic elastomer (TPE) material with high abrasion resistance.

The installation of the sealing set (30) between the interior surface (11) of the rod (10) and the sealing set groove (21) of the piston (20) is as follows:

The energizer ring (32) is mounted in the sealing set groove (21) in the first place. The seal ring (31) in the sealing set (30) that is in contact with the interior surface (11) of the rod (10) is easily mounted on the energizer ring (32) thanks to its Z-cut after this assembly. The seal ring (31), which is placed on the energizer ring (32) consisting of a highly elastic material that activates the sealing set (30), is contacted with the interior surface (11) of the rod (10) as a result of the pressure applied by the system. The back-up rings (34) with an angled surface are then placed on the sides of the seal ring (31). Finally, the mounting is completed by positioning the guide elements (33) against the groove flanks (211) of the sealing set groove (21).

The working principle of the sealing set (30) is as follows:

The guide elements (33) lean against the groove flanks (211) of the sealing set groove (21) from the side where the pressure comes in the −x-axis direction in the rod (10). The back-up ring (34) moves towards the lower side of the guide element (33) in the −y direction with this leaning due to the gaps between the guide elements (33) and the groove flanks (211) and the piston (20) wall, and the guide element (33) leans and provides contact by moving to the interior surface (11) of the rod (10) in the +y direction due to this movement. The permissible sealing gap (S) is prevented from exceeding the determined limits with the 45° angled surfaces of the back-up rings (34) and the guide elements (33). The parts that contact the interior surface (11) of the rod (10) are completely closed, preventing the fluid from flowing under pressure into the gaps that may occur between the seal ring (31) and the energizer rings (32) by this blocking.

The invention claimed is:

1. A sealing assembly comprising:
    a double-acting telescopic cylinder having a plurality of nested rods;
    a piston affixed to each of the plurality of nested rods, said piston having a sealing set groove with groove flanks;
    a sealing ring positioned in said double-acting telescopic cylinder, said sealing ring adapted to provide dynamic sealing against pressurized fluid that applies a pressure effect force of said piston to a surface of a nested rod of said plurality of nested rods, said sealing ring sealing between the piston and the nested rod;
    an energizer ring applying pressure to said sealing ring;
    a back-up ring positioned on opposite sides of said sealing ring, said back-up ring having an angled surface; and
    a guide element positioned in mirrored relationship to the groove flanks of the sealing set groove of said piston along an X-axis, said guide element bearing against the groove flanks as a result of the pressure effect force along the X-axis, said guide element having an angled surface contacting the angled surface of said back-up ring so as to have slidable movement along the angled surface of said back-up ring so as to ensure continuous contact with the variable diameter of said piston.

2. The sealing assembly of claim 1, wherein the angled surface of said back-up ring has an angle of 45° with respect to horizontal.

3. The sealing assembly of claim 1, wherein said back-up ring is formed of a thermoplastic elastomer.

4. The sealing assembly of claim 1, wherein the angled surface of said guide element has an angle of 45° with respect to horizontal.

* * * * *